Sept. 1, 1936. A. NYMAN 2,052,986
BALANCING RADIO SYSTEM
Filed Oct. 22, 1931 6 Sheets—Sheet 1

INVENTOR
Alexander Nyman
BY
ATTORNEY

Sept. 1, 1936.  A. NYMAN  2,052,986
BALANCING RADIO SYSTEM
Filed Oct. 22, 1931  6 Sheets-Sheet 2

INVENTOR
Alexander Nyman
BY
Samuel Ostrolenk
ATTORNEY

Sept. 1, 1936. A. NYMAN 2,052,986
BALANCING RADIO SYSTEM
Filed Oct. 22, 1931 6 Sheets—Sheet 3

INVENTOR
Alexander Nyman
BY Samuel Ostrolenk
ATTORNEY

Sept. 1, 1936.  A. NYMAN  2,052,986

BALANCING RADIO SYSTEM

Filed Oct. 22, 1931  6 Sheets-Sheet 4

INVENTOR
Alexander Nyman
BY
ATTORNEY

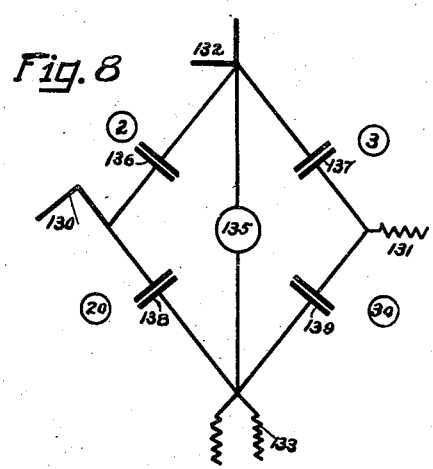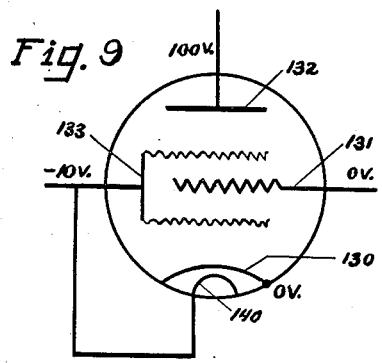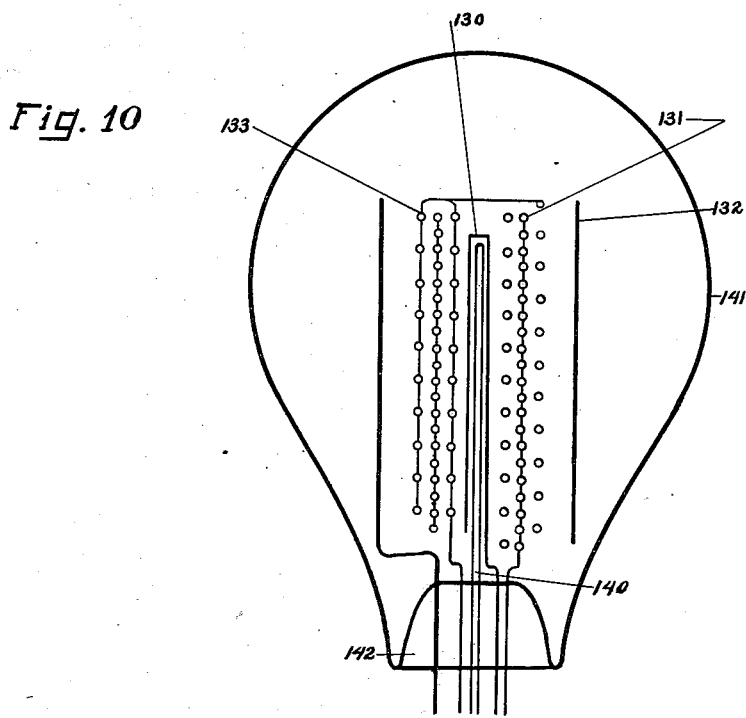

Sept. 1, 1936.   A. NYMAN   2,052,986
BALANCING RADIO SYSTEM
Filed Oct. 22, 1931   6 Sheets-Sheet 6

INVENTOR
Alexander Nyman
BY
ATTORNEY

Patented Sept. 1, 1936

2,052,986

UNITED STATES PATENT OFFICE 2,052,986

BALANCING RADIO SYSTEM

Alexander Nyman, Dobbs Ferry, N. Y., assignor, by mesne assignments, to Radio Corporation of America, a corporation of Delaware Application October 22, 1931, Serial No. 570,372

25 Claims. (Cl. 179—171)

My invention relates to novel apparatus for and methods of operating amplifier circuits, and more particularly relates to apparatus for and methods of balancing the capacity between the elements of vacuum tubes and the distributed capacity of the amplifier parts in such circuits.

I have discovered that in series amplifiers such as disclosed in my application for Series coupled amplifiers, Serial No. 518,098 filed February 25, 1931, now Patent No. 1,986,597, issued on January 1, 1935, of which this application is a continuation in part, the internal tube capacity and distributed capacity is an important factor in the amplification constant of the circuit and its oscillating properties particularly when operating at high frequencies.

Accordingly, an object of my invention is to provide means for balancing the distributed capacities in a series amplifier circuit.

A further object of this invention is to provide means for introducing necessary capacitative currents in the various parts of the series amplifier.

Another object of this invention is to arrange the above balancing elements so as to eliminate or place under control the regenerative effects caused by them.

Still a further object of this invention is to utilize capacity elements for such balancing.

Another object of my invention is to utilize capacity bridge means for such balancing elements.

A further object of the invention is to utilize means including capacity and resistance elements for such balancing bridges.

Still a further object of my invention is to utilize means including inductive elements to supply the capacitative currents of the series amplifier.

Still a further object of my invention is to provide means for capacity balancing through certain electrodes of the vacuum tubes.

A further object of my invention is to provide a preferred type of tube with a special arrangement and construction of electrodes for balancing purposes.

A still further object of my invention is to provide a preferred form of screening and interconnecting of electrodes whereby complete balancing of capacity currents can be secured in this amplifier.

According to one embodiment of my invention the capacity between the elements of the tube and the distributed capacity are utilized in combination with balancing elements for the purpose of regulating the distribution of voltage over the different parts of the amplifier in such a manner as to secure substantially a full degree of amplification at all the different frequencies at which such amplifier must operate, and to avoid or to introduce as desired the regenerative effects by means of such balancing elements.

According to a further embodiment of my invention, the balancing of electrostatic capacity of elements can be secured by applying correcting potentials to some of the elements of the vacuum tubes.

In the drawings, Figure 1 shows the diagram of a series amplifier in which I have diagrammatically indicated the distributed capacities that may exist between the various elements of the tube and between the elements of the amplifier and the ground circuits.

Figure 8 illustrates diagrammatically the capacity relation in a preferred type of vacuum tube.

Figure 9 is a diagrammatic representation of a preferred type of vacuum tube.

Figure 10 shows constructional details of a preferred type of vacuum tube.

Figure 1:
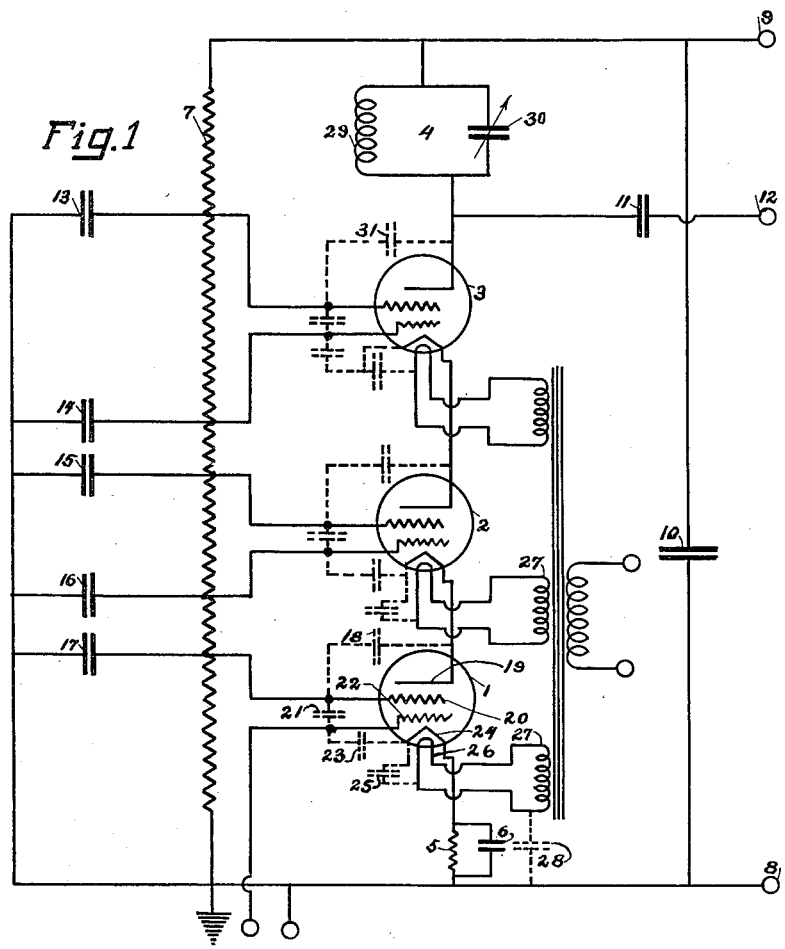

Referring to Figure 1, I have shown a three stage series amplifier comprising four element tubes 1, 2, and 3 in series with a tuned circuit 4, and a biasing resistor 5 with a bypass condenser 6. Circuit 4 is tuned to the frequency range which the circuit is to amplify. A potentiometer 7 providing biasing potentials to the intermediate electrodes of tubes 1, 2, and 3 and the direct current power potential are connected to terminals 8 and 9, the terminal 9 being positive. A bypass condenser 10 completes the amplifying circuit and the output of the amplifier is secured through a condenser 11 to a terminal 12. Grounding condensers 13, 14, 15, 16, and 17 are supplied for the various grids for permitting a free flow of radio frequency currents to the ground connection.

As illustrated in Figure 1 by dotted lines, there are capacity effects between the various tube elements as, for instance, for tube 1 there is a capacity 18 between the plate 19 and a second control grid 20, a capacity 21 between the first control grid 22 and the second control grid 20, a capacity 23 between the first control grid 22 and the cathode 24, and a capacity 25 between the cathode 24 and a heater 26 for said cathode. The circuit of the heater which may include the secondary 27 of a filament supply transformer has moreover a capacity 28 to the ground connection through this transformer. The other tubes have similar capacity relations, as illustrated by dotted lines.

It is quite evident, that if the tubes act as an amplifier at high frequency these various capacities must be supplied with capacitative current and such capacitative current forms a constant load on each of the tubes, reducing the amplification values unless a separate source of capacitative current is provided. The capacitative current is in general almost entirely reactive; that is, its energy component is quite small. It could, therefore, be conveniently supplied from an inductive element such, for instance, as the inductance 29 of the tuned circuit 4 if these capacities were in parallel with the tuning condenser 30 and formed a part of the tuning circuit. This happens to be the case for the capacity 31 between the second control grid of the tube 3 and its plate. This capacity is in series with grounding condenser 13 and a return condenser 10 across the tuned circuit. Similar paths could be traced for all of the distributed capacities so that some of the current for these capacities may be supplied from the tuned circuit.

But in order to secure the full amount of capacitative current corresponding to the voltage between any two elements over which the capacity exists, it is necessary to provide some distributing means of reactive current, as derived from the tuning circuit. These bridging means must be such that substantially all of the capacitative current and no more than that is supplied, since an excess of capacitative current would really amount to a regenerative coupling and would tend to create oscillations in the system. The subsequent figures illustrate the various means for providing the capacitative currents of the tube elements and from the tube elements to ground.

Figure 2:
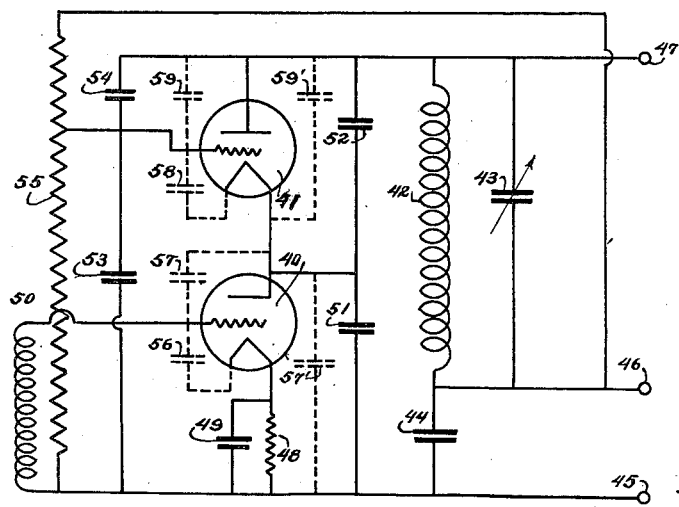
Figure 2 is a diagrammatic representation of two stages of amplification, their distributed capacities, and the compensating capacity bridges, which is the simplest form of compensation of these capacity effects.

Referring to Figure 2, a two stage amplifier including tubes 40 and 41 is connected in series with a tuned circuit consisting of inductance 42 and condenser 43, a return condenser 44, negative supply lead 45, positive supply lead 46, and an output terminal 47. A biasing resistor 48 is connected to the cathode of tube 40 and a bypass condenser 49 is provided for this biasing resistor. The input to the grid of tube 40 may be supplied from an input source 50.

A bridge system comprising condensers 51 and 52 is connected to the anodes and cathodes of the two stages and a bridge system consisting of condensers 53 and 54 is connected to the grid of the tube 41. A potentiometer 55 supplies a steady grid potential to the grid of tube 41. The capacity between the tube elements of tube 40 are shown as 56 between its grid and cathode, 57 between its grid and anode, 57' between anode and ground. Similarly, the capacities of tube 41 are shown as 58 between its grid and cathode, 59 between its grid and anode, and 59' between anode and cathode.

Referring first to the cathode bridge condensers 51 and 52, it will be seen that condenser 52 is now parallel with capacity 59' and with capacities 58 and 59 in series. Similarly, condenser 51 is now parallel with condenser 57' and with condensers 49, 56, and 57 in series. Considering capacities in this manner and disregarding for the present the effect of capacities 53 and 54, it is quite evident that the values of condenser 51 and 52 can be chosen in such a manner that the cathode of tube 41 and the anode of tube 40 will be having the correct amplified potential or slightly below this amplified potential by virtue of this capacity bridge. Similarly, in the grid bridge, condenser 54 is now parallel with capacity 59 and condenser 53 is now parallel with the capacities 58, 57, 56, and 49 in series. This bridge again can be adjusted so that the grid of tube 41 receives the correct potential for amplifying purposes. I have found that with these types of bridges the adjustment can be made to increase the amplification to the full amplification value of the tube to a regenerative condition and further into an oscillating condition.

I have also found that the adjustment is more or less independent of the frequency of the tuned circuit over a certain working range, but of course this is contingent on the fact that the capacity values such as 56, 57, 58, and 59 are quite small relative to the capacity of the tuning condenser 43, and therefore the balancing condensers may be also of relatively small capacity. If, however, the tubes are so constructed or the connections are so located that this capacity is increased, then the inductive effect of the leads and connections would be such as to upset the balance when the frequency is changed.

Figures 3A, 3B, 3C:
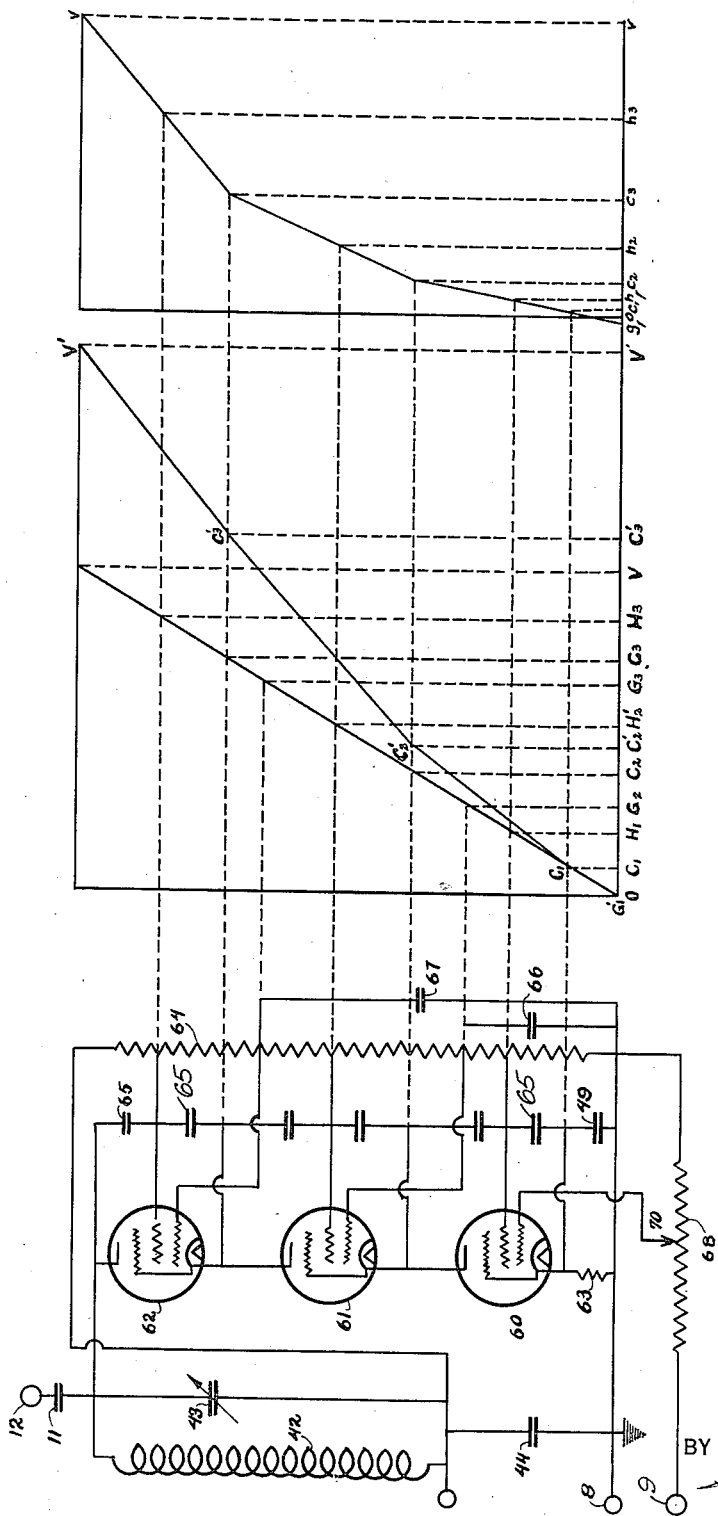
Figure 3A is an extension of a similar circuit as applied to three stages of amplification and illustrates a complete circuit diagram.
Figures 3B and 3C are explanatory diagrams for illustrating how the presence of the bridge affects the operation of the amplifier shown in Fig. 3A.

Referring to Figure 3A, a further embodiment of my invention is shown comprising a circuit including a three tube series amplifier including the pentode tubes 60, 61, and 62, the tuning circuit containing inductance 42 and variable condenser 43, a return condenser 44, biasing resistor 63 for the cathode of tube 60, and a potentiometer 64 to which the various grids of the pentodes are connected. I have also shown an output terminal 12 with a separating condenser 11 as in Figure 1, a positive input terminal 9, and a grounded negative input terminal 8. I have shown as a balancing bridge in this case a series of condensers 65 connected one after the other to the different elements of the three tubes and the capacities of these condensers are so arranged that each electrode receives the voltage corresponding to its effective amplifying condition. This is explained clearer in reference to Figure 3B.

For an input, I have shown diagrammatically a potentiometer 68 supplied with high frequency current at the terminal 8—9, and a tap 70 for giving the voltage to the first or control grid of tube 60. The control grids of tubes 61 and 62 are connected to suitable taps on potentiometer 64 and hence through grounding condensers 66 and 67 to the negative lead 8.

Referring to Figure 3B which illustrates diagrammatically the distribution of voltages along the various tube elements, the ordinates of this diagram represent the various tube elements, as illustrated by the dotted lines drawn from one diagram to the other. The abscissa represents the steady direct current applied to these different points when the system is in operating condition.

Considering first the tube 60 and referring to diagram Figure 3B, it will be seen that its cathode is held at the potential $C_1$, while the grid of the same tube is held at the potential O by connection through the tap 70 to the negative lead 8. The potential $OC_1$ represents then the drop of direct current potential through the biasing resistor 63. The second grid of the pentode tube carries a potential $H_1$, as obtained from the potentiometer 64. The anode of tube 60 connected to the cathode of tube 61 has a potential $C_2$. The control grid of tube 61 has a potential $G_2$ obtained from potentiometer 64 and the second grid a potential $H_2'$. Similarly, the elements of tube 62 have the potentials $C_3$ on the cathode, $G_3$ on the first grid, $H_3$ on the second grid, and potential V on the anode of this tube. This represents the normal distribution of the potentials before any radio frequency is applied to the circuit.

If now a radio frequency potential is applied to the terminals 8—9, the tap 70 has a potential which may be represented by $OG'_1$ at any particular instant, as indicated in the diagram. As the bias on the grid of tube 60 is now increased at that instant to a value $G_1G'_1$, the impedance of this tube is raised and the potential distribution through the tubes would be represented by the line $C_1C_2'C_3'V'$, giving new values for the potentials of tubes 60, 61, and 62 in accordance with the amplification factors of these tubes. Thus, the potential of the cathode of tube 61 being increased from $C_2$ to $C_2'$, the grid bias at that instant on tube 61 would be represented by $G_2C_2'$, the increase of this bias (that is, $C_2C_2'$) bearing a proportion to the increase of the grid bias of tube 60 (that is, $OG_1'$), corresponding to the amplification factor of this tube. The tube 61 will amplify this voltage change further still so that the cathode of tube 62 will have a new potential $C_3'$, with the potential $C_3C_3'$ corresponding to the multiplication of the amplification factors of tubes 60 and 61.

Similarly, the potential on the anode of tube 62 is represented by the new point V' in such a way that the potential VV' is the multiplication of the amplification factors of the three tubes 60, 61, and 62.

For a further consideration of the effect of the balancing bridge, reference is made to Figure 3C in which only the radio frequency potentials caused by the amplification through the tube are represented. Thus, the distance $og_1$ corresponds to the root means square value of such voltages as $OG_1'$ of Figure 3B; $c_1c_2$ corresponds to the voltage $C_2C_2'$ of Figure 3B, and so forth. It is evident that the potentials of control grids of tubes 61 and 62 are held practically at potential O by means of grounding condensers 66 and 67 and the bypass condenser 49 keeps the cathode of tube 60 at a small difference of potential $oc_1$ from the negative lead 8. Thus, the high frequency potential between the cathode and grid of tube 61 is $oc_2$ and the high frequency potential between the cathode and control grid of tube 62 is represented by $oc_3$, while the output high frequency potential between the terminals 8 or 9 and the anode of tube 62 is represented by $ov$ and is the output radio frequency potential.

In the discussion hereinbefore, the effect of distributed capacities has been disregarded. In practice, the distributed capacities would have a tendency to reduce the above represented values by changing the amplification factor of each of these tubes by virtue of the loading of the tube by its associated distributed capacities. However, by means of the bridge 65 connection, the capacity of the elements of tubes 60, 61 and 62 is associated with this bridge and supplied with capacitative current from the tuned circuit 42—43. By choosing the correct values for the different units of this bridge 65, it is adjusted so that the radio frequency potentials at the different electrodes will correspond substantially to potentials of Figure 3C, thus maintaining the full amplification values of these tubes.

For example, the potential of the second grid of tube 60 may be held at the value $h_1$; its anode at the value $c_2$ and the cathode of tube 61 being connected to the anode of tube 60, also has a potential $c_2$. The second grid of tube 61 is held at $h_2$ and the anode of tube 61 at $c_3$, which corresponds to the cathode potential of tube 62.

The effect of the bridge is therefore to duplicate that distribution of potentials along the chain of series amplifying tubes as would be given by this series of tubes if there were no distributed capacities. In practice, of course, the bridge does not have to supply an exact duplicate of such a voltage. A supply of lesser value of high frequency potentials would result in slightly lower amplification. An excess of these potentials would give an effect of regeneration; that is, an amplificaiton in excess of that given by the tube constants, and a further increase of the potentials given by the bridge would create a condition of oscillation.

Since the direct current potentials applied by potentiometer 64 will in general differ from the value of the high frequency potential at the same spots, this resistance value must be high enough not to interfere with the distribution of high frequency potentials.

I have shown in Figure 3A pentode tubes as I have found that this type of tube possessing low internal impedance is particularly suitable for this type of amplifier.

In general, the amplification of a series amplifier is dependent to a great extent on the ratio between the impedance of the tuned circuit and the tube impedance. Therefore, by keeping this ratio as high as possible, I secure the most effective amplification, and this can be done with particular advantage with pentode tubes, which have a low impedance characteristic. It will be understood however that pentode tubes are shown for purpose of illustration and my invention is equally applicable in systems employing any other form of electron valves.

Figure 4:
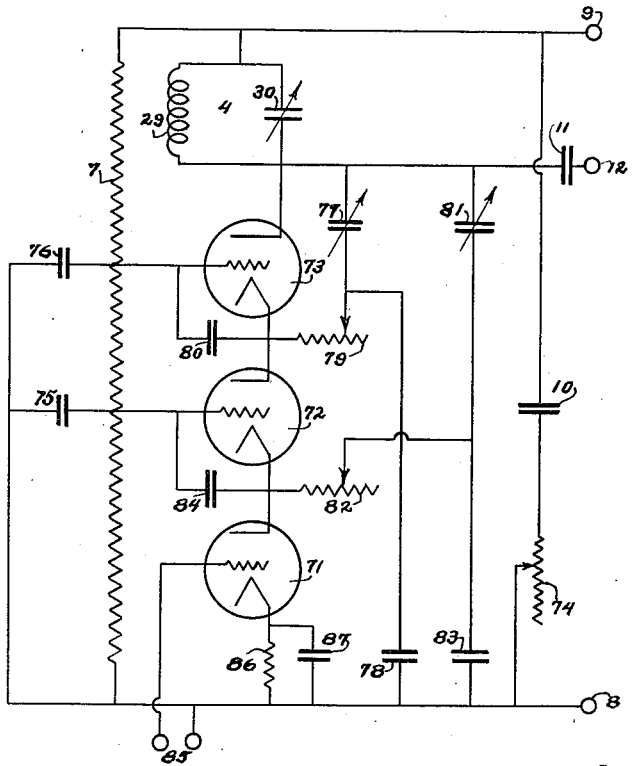
Figure 4 illustrates an alternative form of bridge, using capacity and resistance elements.

In Figure 4, a further embodiment of my invention using three-electrode tubes 71, 72, 73, is shown. Connected in circuit with these tubes is a tuned circuit 4 consisting of inductance 29 and a variable condenser 30, a potentiometer 7, negative terminal 8, positive terminal 9 for the power supply, an output terminal 12 in series with a coupling condenser 11, a return condenser 10 and a resistor 74 in series with this condenser. I have also shown grounding condenser 75 for the grid of tube 72 and grounding condenser 76 for the grid of tube 73.

Two separate bridges, one for the cathode and grid of tube 73 and the other for the cathode and grid of tube 72 are provided. For the tube 73 condensers 77 and 78 in series from the high tension end of the tuned circuit 4 to the negative lead 8 and a resistor 79 from the point between these condensers to the cathode of tube 73, are supplied. Another condenser 80 connects this cathode to the grid of tube 73 and a circuit is completed through the grounding condenser 76. Considering first this bridge by itself, it will be seen that the resistor 79 and condenser 77 are made adjustable. I have found that by this arrangement the balancing of the capacities of tube 73 can be very accurately adjusted. The resistor 79 which is included in this balancing circuit and forms a circuit with condenser 77 from plate to cathode of the tube 73, helps to keep this tube below its oscillating point. On the other hand, the condensers 80 and 76 can be conveniently chosen to maintain the grid potential of tube 73 at its correct value. The condenser 78 is not essential as the bridge circuit is also completed through the condensers 80 and 76. If preferred, the condenser 80 may be omitted and the grid of tube 73 held near the O potential by the grounding condenser 76. A similar bridge arrangement including adjustable condenser 81, adjustable resistor 82, and condensers 83 and 84, together with the grid condenser 75, form the bridge for the elements of tube 72 and for the anode capacity of tube 71. This bridge again can be separately adjusted by varying the capacity 81 relative to other capacities of the bridge and brought to a stable non-oscillating condition by a suitable value of resistance 82. Again, either condenser 83 or 84 may be omitted. The resistor 74 in series with the return condenser 10 may serve to further stabilize the system if it has a tendency to oscillate. I have found that with this circuit connection it is possible to secure quite stable amplification of a large degree even when the whole circuit is not shielded as the various balancing circuits contain sufficient damping elements to prevent oscillating conditions. The input to the grid of tube 71 is from terminals 85 and a biasing resistor 86 with a bypass condenser 87 are provided to create the necessary steady potential between the cathode of tube 71 and its grid.

Figure 5:
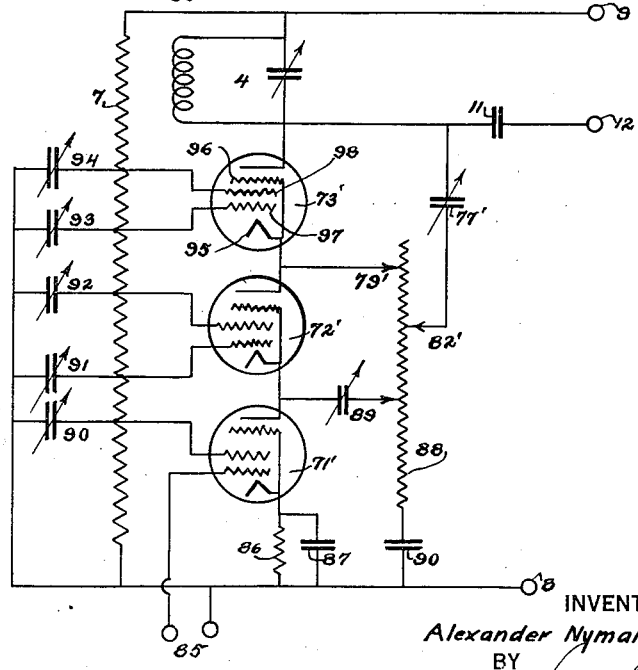
Figure 5 shows an alternative form of a capacity and resistance bridge.

Referring to Figure 5, I have shown an alternative arrangement using a condenser and resistance bridge wherein the number of bridge elements is reduced. Thus, a single potentiometer 88 has taps so that the capacity bridge of tube 73' includes the adjustable condensed 77' and a section 79' of the potentiometer while the bridge for tube 72' includes another section 82' of the potentiometer and the adjustable condenser 89. The condenser 90 electrically isolates the potentiometer from the negative lead 8, the potentiometer will be therefore at the potential of the anode of tube 72' and the cathode of tube 73' and the condenser 89 isolates the anode of tube 71' and the cathode of tube 72' from this potentiometer. Grounding condensers 90, 91, 92, 93, and 94 are supplied for the various grids as the tubes are of the pentode type. Using three element tubes the number of these grounding condensers will be reduced to two.

By choosing suitable values for capacities of the grounding condensers, bridges are formed for the various grids through the internal capacities of the tube itself. Thus, for tube 73' its cathode 95 connected to the third grid 96 will have distributed capacities to the first grid 97 and the second grid 98 and the capacity bridge is completed from the cathode 95 through the distributed capacities and the grounding condensers 93 and 94. Some of these grounding condensers may be conveniently made adjustable so that the correct potentials are applied to the various grids.

All of the grids may be connected to the common potentiometer 7 and the output of the amplifier secured from the tuned circuit 4, as in previous diagrams.

Figure 6:
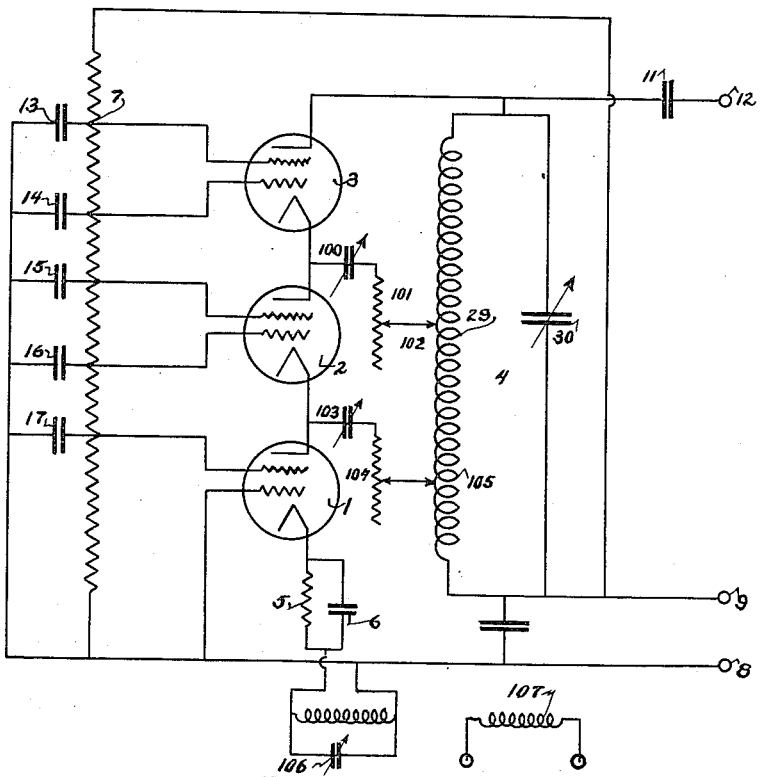
Figure 6 shows an inductance bridge.

I have shown in Figure 6 a further modification of a balancing bridge in which instead of providing a capacity bridge, the reactive currents are secured directly from the tuning inductance 29. I have shown four element tubes similar to tubes 1, 2, and 3 of Figure 1 and grounding condensers 13, 14, 15, 16, and 17 from the various grids to the negative lead 8. Proper steady potentials are applied to the various grids through their connections to the common potentiometer 7. The cathode of tube 3 is connected through an adjustable condenser 100 and preferably an adjustable resistor 101 to a tap 102 on inductance 29. Thus, a suitable reactive current is fed directly from this tap to this tube connection. The grounding condensers 13 and 14 are then adjusted so that the corresponding grid will have the correct potential. Similarly, the anode of tube 1 and the cathode of tube 2 are supplied with reactive current through an adjustable condenser 103, an adjustable resistor 104, from the tap 105 on the inductance 29 and again the grounding condensers 15, 16, and 17 can be adjusted to secure the correct high frequency potentials on the corresponding grids.

I have shown in this circuit a modification of the input arrangement wherein the input, instead of being applied to the grid of tube 1, is fed through the biasing resistor 5 with its bypass condenser 6 to the cathode of tube 1. The input consists of a tuned circuit 106 tuned to the input frequency and coupled to an input coil 107, and this tuned circuit is connected to the negative lead 8 and to the biasing resistor 5. Thus, instead of varying the grid potential of tube 1, I vary the corresponding cathode potential. Therefore, the capacity between the first grid of tube 1 and its cathode is supplied from the tuned circuit 106 while the remaining capacities are all supplied from the output tuning circuit 4. The remaining elements of this diagram correspond to those of Figure 1. In all of the above circuits I have utilized partially at least some of the tube capacities for performing the function of balancing in combination with external bridges.

Figure 7:
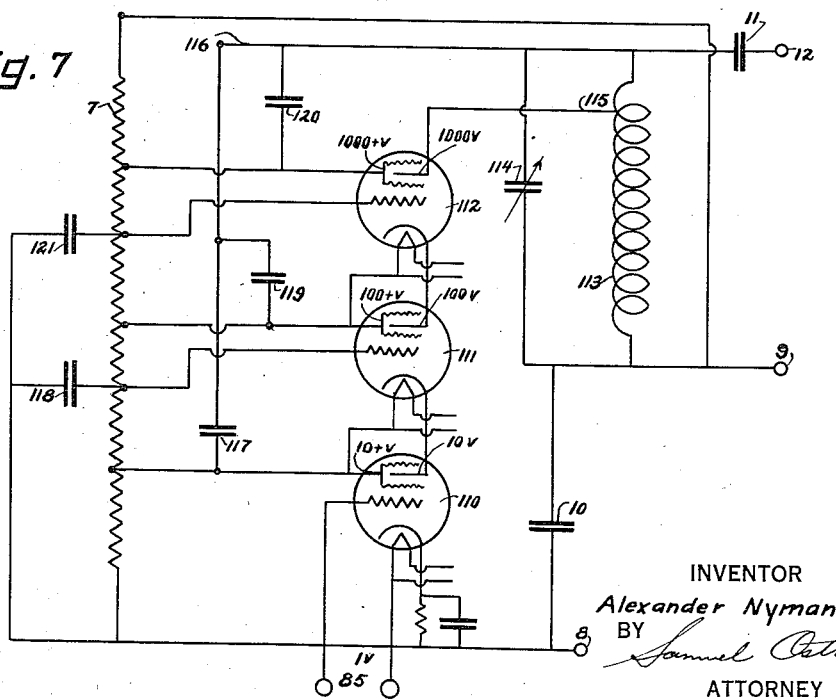
Figure 7 shows an amplifier with means for utilizing certain tube elements for balancing purposes.

I have further extended this principle in Figure 7 wherein a special grid which may be a screen grid of a screen grid tube is utilized for leading in all of the capacitative currents into the amplifier. Figure 7 shows a three stage series amplifier including screen grid tubes 110, 111, 112, a tuned circuit including an inductance 113 and adjustable condenser 114, negative lead 8, and a positive lead 9 for the direct current power supply, a return condenser 10, and a coupling condenser 11 to the output terminal 12. A potentiometer 7 supplies the steady potentials to the various grids including the screen grids of the three tubes 110, 111, 112. The output of tube 112 is arranged to feed into a tap 115 on the tuning inductance 113 while the end of this tuning inductance supplies through a lead 116, the capacitative currents to the screen grids of the three tubes.

Thus, considering first the tube 110: If the control grid of this tube is fed from the input terminals 85 with a high frequency potential of a value 1, and the tube 110 with the particular electrode potentials amplifies ten times so that its anode potential is ten units, condenser 117 from the lead 116 to the screen grid of tube 110 is made of such a value that its potential is slightly in excess of ten units. Therefore, the plate of tube 110 being of slightly lower potential will not be called upon to supply any capacitative current but the capacitative current will flow directly from the screen grid of tube 110 to its various elements, such as control grid and cathode.

The cathode of tube 111 is connected to the anode of tube 110 and will have ten units of potential while its grid is held at the ground potential at radio frequency by providing a grounding condenser 118. The tube 111 will then amplify its cathode potential ten times so that its anode will have a hundred units of potential. I then supply a condenser 119 from the lead 116 to its screen grid, of such a magnitude that the potential on this screen grid is slightly in excess of one hundred and again this screen grid will supply the capacitative current to the control grid of the tube 111 and to its cathode.

I may further stabilize this arrangement by connecting the heater of the cathode of tube 111 directly to the screen grid of tube 110. Thus, this heater will carry practically the same potential as its corresponding cathode and no capacitative current will flow between those two. Since in general the capacity between the heater and the cathode, such as that of tube 111, is relatively large and the capacity between the anode of tube 110 and its screen grid is also large, the capacitative current coming from the screen grid of tube 111 to its cathode which is determined by the internal capacity of this tube and is therefore relatively small will have practically no effect on the cathode potential of tube 110 and will therefore prevent any possibility of regeneration in this system. I have supplied further a similar condenser 120 for the tube 112 which provides a potential slightly in excess of a thousand on the screen grid while the anode of this tube, by virtue of amplification, will have a potential of around a thousand. Grounding condenser 121 keeps the grid of tube 112 at the ground potential at radio frequency while a tap to potentiometer 7 provides the correct steady potential.

Referring next to the capacitative current that may be necessary between the control grids of the tubes and their corresponding cathodes and considering, for instance, the tube 112, this capacitative current can be supplied by the condenser 119 via the screen grid of tube 111 and the capacity between this screen grid and its corresponding anode. There is, moreover, an alternative path for this capacitative current namely from the condenser 119 to the heater of tube 112 and therefrom through the capacity between the heater and the cathode to the electrode capacity between the cathode and the grid. Similarly, the capacitative current between the control grid and cathode of tube 111 is supplied by condenser 117; while the capacitative current between the control grid 110 and its cathode will in general be supplied from the input terminals 85 which, for this purpose, may be connected to another tuned circuit. However, in general, since the value of this capacity is small relative to the available energy supply, this capacitative current can be supplied without difficulty.

I have thus devised a system for supplying the capacitative currents to the tubes through a special electrode such as a screen grid. It will still be seen that a proper adjustment of condensers such as 117, 119 and 120 is necessary to give the potentials suitable for supplying such capacitative currents.

I have further devised an alternative system wherein the elements within the tube are inherently balanced with respect to a special electrode for supplying the capacitative currents. I have illustrated in Figure 8 diagrammatically in the form of a Wheatstone bridge, the elements of such a tube. In this diagram, 130 represents the cathode; 131 a control electrode; 132 the anode; and 133 an electrode for supplying the capacitative currents. I have illustrated by 135 the supply of capacitative currents which may be a tuned circuit such as the tuned circuit 4 of Figure 1 and I have indicated by condensers 136, 137, 138 and 139 the internal capacities between these various tube elements which form the Wheatstone bridge arrangement. I propose to arrange the capacitative effects within the tube; that is, between its elements, in such a way that these capacities will bear the following relation:

$$\frac{\text{Capacity } 136}{\text{Capacity } 138} = \frac{\text{Capacity } 137}{\text{Capacity } 139}$$

In this way, the Wheatstone bridge arrangement is balanced, and as known from the theory of this bridge, it will result in no potential being applied between the electrodes 130 and 131 which represent respectively the cathode and the control grid. Therefore, such a tube with an electrode for supplying a capacitative current is inherently stable. In other words, this capacitative current does not apply any potential between the control grid and the cathode and therefore results in no disturbance to the amplified output of the tube.

I have illustrated diagrammatically in Figure 9 the preferred construction of such a tube. As shown, the electrode 133, for supplying capacitative current surrounds the control electrode 131. Thus, the capacity between the elements 133 and 131, which is represented by 139 of Figure 8, is relatively large. In the usual construction, the control electrode and therefore its surrounding screen grid 133 will be located close to the cathode. Therefore, the capacity represented as 138 in Figure 8; that is, between the cathode and the balancing electrode 133, will also be relatively large. On the other hand, the capacity 136 between the anode 132 and the cathode, which is separated by a relatively large distance, will be small and also the capacity 137 between the anode 132 and the control grid 131 will be small as this control electrode is surrounded by a screening grid 133. I have also illustrated in Figure 9 a heater 140 for the cathode 130 and I have shown in a preferred arrangement a connection from this heater to the balancing electrode 133, which may be external to the tube and which adds, furthermore, a capacity effect between the cathode and the balancing grid which is part of the value 138 of Figure 8.

Figure 10 shows the mechanical structure of such a tube. In this tube a cylindrical cathode 130 has an internal heater 140 and a surrounding control grid 131 of relatively narrow mesh, while the balancing grid 133 surrounds on all sides the control grid 131 and may be of relatively wide mesh so as not to impede the flow of electrodes nor control them by the potentials applied to it. The anode 132 may surround the whole structure. The tube may be mounted in the usual way in a vacuum vessel 141 and the leads brought out through a sealing press 142.

Figure 11:
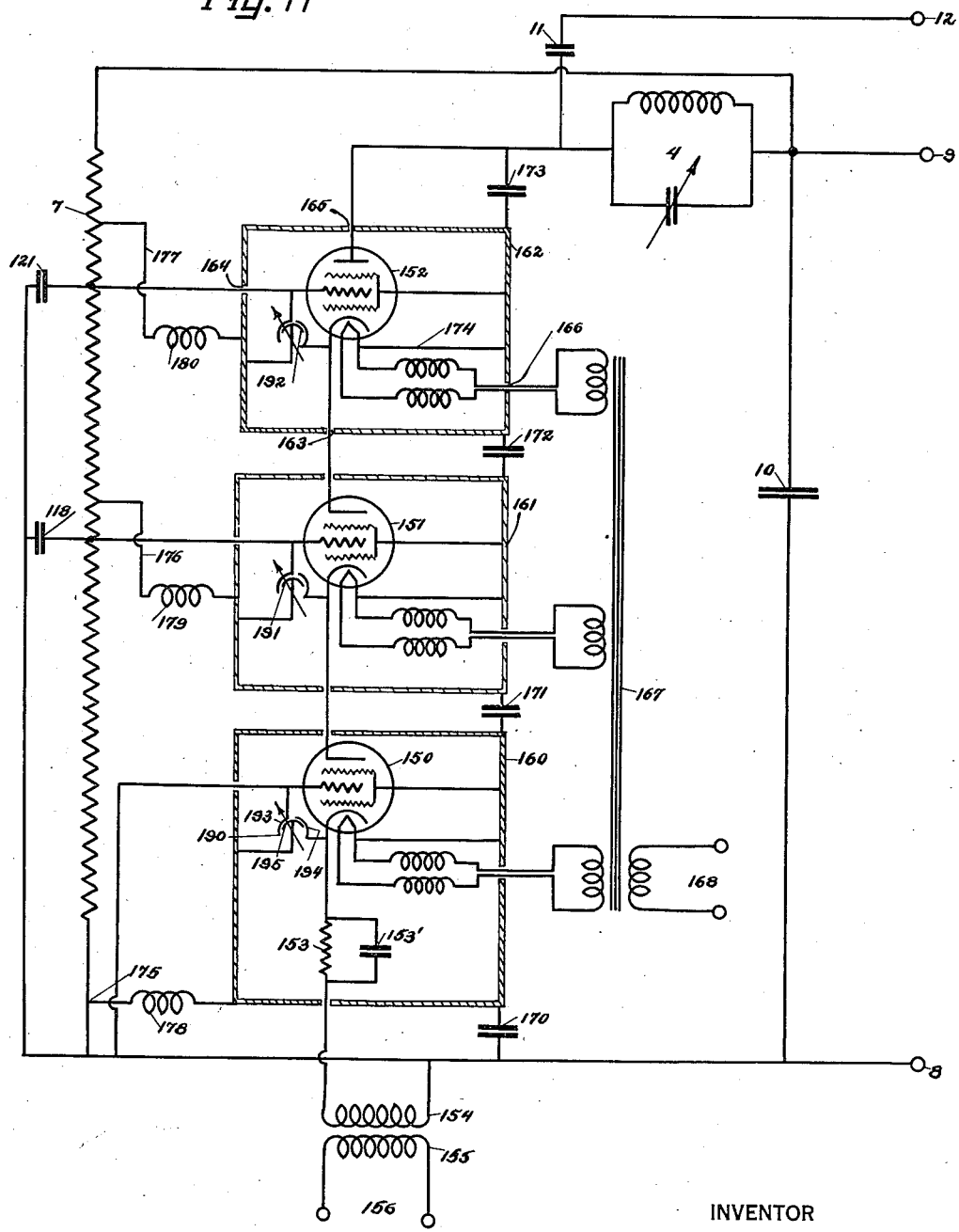
Figure 11 is a complete amplifier utilizing the preferred type of vacuum tube.

I have shown in Figure 11 the circuit utilizing this type of tube in a series amplifier. I have shown a positive supply lead 9 and negative supply lead 8 with a return condenser 10 between them, an output terminal 12 connected through the condenser 11 to the tuning circuit 4, and three tubes, 150, 151, and 152 of the type illustrated in Figures 8, 9 and 10 constituting the series amplifier and connected from anode to cathode in the usual manner. A biasing resistor 153 is connected to the cathode of tube 150 and has a bypass condenser 153'. The input potential may be applied directly to the biasing resistor 153 from a winding 154 which may be inductively supplied from any suitable source such as the primary winding 155 with the terminals 156. The other side of the winding 154 is connected to the negative lead 8, while the anode of tube 152 is connected to the tuning circuit 4 and thus the series amplifying circuit is completed.

I have shown the connections of control grids of tube 150 to the negative lead 8 and the control grids of tubes 151 and 152 to a potentiometer 7 connected to the supply leads 8 and 9. The control grids of tubes 151 and 152 are also connected to grounding condensers 118 and 121, which correspond to the similar elements of, say, Figure 7.

I have shown the tubes 150, 151, and 152, each one enclosed respectively in screening compartments 160, 161, and 162, thus isolating each amplification stage and bringing out through suitable outlets in this container, the leads for various electrodes and for the heater. Thus, for tube 152 the cathode connection is brought out through an opening 163; the control grid connection is brought out through an opening 164; the anode is brought out through opening 165, and the heater connections through an opening 166. The heater connections may be supplied from a transformer 167 with suitable energizing alternating current, the energy being applied to the terminals of the primary of this transformer 168.

I have, moreover, shown condensers 170, 171, 172, and 173 which form a chain between the containers from the negative lead 8 to the tuning circuit 4. Thus, by means of these condensers, high frequency potentials are applied to the various containers, corresponding approximately to the range of their operating high frequency potential. In practice, the capacity of condenser 170 would be much larger than that of 171. Again, 171 would be larger than 172, and 172 larger than 173. The container is internally connected to the balancing grid of its corresponding tube.

Thus, the potential applied to the container through the condenser bridge 170, 171, 172, and 173 is further applied through the above connection to the corresponding balancing electrode. As the balancing electrode will carry a potential different from the anode and within the range of operation of the tube, the condition of the Wheatstone bridge circuit of Figure 8 is fulfilled and an inherent balancing will be secured within the tube.

I have shown, furthermore, the connections such as 174 from the heater to the container which correspond to the connections shown in Figure 9 between the heater and the balancing grid. There are further connections 175, 176, and 177 respectively from the containers 160, 161 and 162 to tapped points on potentiometer 7, by means of which the correct steady potentials are applied to the balancing grids of such value as not to disturb the amplification of the corresponding tubes. This connection may contain further choke coils such as 178, 179 and 180 which will isolate the potentiometer 7 from any high frequency current coming from the energized screens, although such choke coils in general are not essential.

As an additional precaution for securing exact balancing, I have diagrammatically illustrated adjusting condensers such as 190, 191 and 192 respectively in the containers 160, 161 and 162, and connected between the cathode and control grids. These balancing condensers may contain three elements. Referring, for instance, to condenser 190, it will have a fixed plate 193 connected to the control electrode of tube 150, a fixed plate 194 connected to the cathode of tube 150, and a movable plate 195 connected to screen 160. This condenser will, therefore, be seen to be included in the arm 138—139 of Figure 8 and will aid in balancing out the bridge so that the exact condition for preventing the reaction of the balancing capacitative current on the control grid will be secured. Of course, such balancing condensers may be connected to any other of the elements of each of the tubes to adjust its balancing, or this condenser may be entirely omitted, if the tubes are constructed and connected in the circuit to have the exact balancing. It will be seen that the leads from the control electrode and from the cathode are the only ones that are likely to upset the balancing and these are the leads that may require additional balancing by means of balancing condensers such as 190, 191, and 192.

It is, of course, evident that the particular arrangement of leads and screening of Figure 11 may be modified but achieving the same or equivalent results. Also, the particular tube construction, shown in Figure 10, may be modified and the tube arrangement described in Figures 8, 9, 10, and 11 may be applied not only to series amplifiers but also to other types of amplifiers, oscillators, or any other circuits which utilize vacuum tube relays.

Experiments carried out with this type of amplifier have clearly demonstrated its ability to secure sharp tuning at any particular frequency by a single coupling circuit such as the circuit 4 in the various diagrams. In fact, the experiments show that on account of the inherent properties of this amplifier, the relation of the degree of amplification to the ratio between the tube impedance and the impedance of the tuned circuit at any frequency, the response characteristic is considerably sharper than can be secured for an equal number of stages of the usual parallel type amplifier. A further reason for this extreme degree of sharpness lies in the fact that it is almost impossible with separate coupling elements to secure an exact degree of tuning at all different frequencies, while in the present amplifier, with a single coupling element for all stages, the exact tuning is automatically secured.

The actual tuning characteristics obtained in the tests show a degree of selectivity for three stages comparable to the selectivity of a crystal oscillator. It is, therefore, possible to utilize the amplifying circuits of this type in various applications where the selectivity corresponding to the crystal selectivity is desirable. The circuit, however, has the further advantage over the crystal that the particular frequency at which the selectivity is secured can be easily adjusted by varying the frequency to which the tuned circuit is adjusted.

The invention, therefore, is not limited to the particular application illustrated, but may have a number of further advantageous uses and should be construed in the light of the appended claims.

I claim:

1. In an electrical circuit, a plurality of valves each having a cathode, control electrode, and an anode, a resonant circuit, a source of current supply, said valves, said resonant circuit and said source being in series, with the anode of one valve being connected to the cathode of the succeeding valve, said valves having internal and distributed capacities, and means for applying a predetermined portion of high frequency operating potential derived from said resonant circuit to the elements of said valves for balancing the effect of the electrostatic capacities thereof.

2. In an electrical circuit, a plurality of valves each having a cathode, control electrode, and an anode, a resonant circuit, a source of current supply, said valves, said resonant circuit and said source being in series, with the anode of one valve being connected to the cathode of the succeeding valve, said valves having internal and distributed capacities, and means including capacitative connections from said resonant circuit to the electrodes of said valves for balancing the capacities thereof.

3. In a series amplifier including a plurality of thermionic valves, a tuned circuit, a source of current supply, said valves, said tuned circuit and said source being connected in series, with the plate of one valve being directly connected to the cathode of the succeeding valve, and a bridge connected to said tuned circuit comprising a plurality of condensers in series with tap connections to the anodes and cathodes of said valves for supplying a capacitative current to said valves.

4. In an electrical circuit, a plurality of valves each having a cathode, control electrode, and an anode, a tuned circuit, a source of current supply, said valves, said tuned circuit and said source being in series, with the anode of one valve being directly connected to the cathode of the succeeding valve, the electrodes of each of said valves having a capacity relation with respect to each other, and means comprising an individual capacity bridge each connected to said tuned circuit for one of said valves with tap connections to the valve electrodes for balancing said capacities.

5. In an electrical circuit, a plurality of valves each having a cathode, control electrode and an anode, a tuned circuit, a source of current supply, said valves, said tuned circuit and said source being in series, with the anode of one valve being directly connected to the cathode of the succeeding valve, said valves having internal and distributed capacities, and capacity bridge means connected between said tuned circuit and the valve electrodes including a resistance element for balancing said distributed capacities.

6. In an electrical circuit, a plurality of valves each having a cathode, control electrode and anode, a tuned circuit, a source of current supply, said valves, said tuned circuit and said source being in series, with the anode of one valve being directly connected to the cathode of the succeeding valve, said valves having internal and distributed capacities, and means including an impedance bridge fed from said tuned circuit and having tap connections to the valve electrodes for balancing said distributed capacities.

7. In an electrical circuit, a plurality of valves each having a cathode, control electrode and anode, a tuned circuit, a source of current supply, said valves, said tuned circuit and said source being connected in series, with the anode of one valve being directly connected to the cathode of the succeeding valve, said valves having internal and distributed capacities, and means including said tuned circuit and circuit connections to said valve electrodes for supplying reactive currents for balancing said capacities.

8. In an electrical circuit, a plurality of valves, a tuned circuit, a source of current supply, said valves, said tuned circuit and said source being connected in series, with the anode of one valve being directly connected to the cathode of the succeeding valve, each of said valves having internal capacity, an auxiliary electrode in one of said valves, and means including said electrode for supplying capacitative currents from said tuned circuit to said electrode.

9. In an electrical circuit, a plurality of valves, a tuned circuit, a source of current supply, the cathode-anode path of said valves, said tuned circuit and said source being in series, with the anode of one valve being connected to the cathode of the succeeding valve, each of said valves having internal capacity, an auxiliary electrode in one of said valves capacitatively connected to said tuned circuit for supplying capacitative current therefor, a screening device individual to said valve for individually enclosing said valve, and an electrical connection from said auxiliary electrode to said screening device.

10. In an electrical circuit, a plurality of valves, a tuned circuit, a source of current supply, said valves, said tuned circuit and said source being connected in series, with the anode of one valve being connected to the cathode of the succeeding valve, each of said valves having internal capacity, an auxiliary electrode in each of said valves capacitatively connected to said tuned circuit for supplying capacitative current therefor, a screening device individual to each of said valves for individually enclosing said valves, and a capacitance device connecting each two succeeding screen devices.

11. In an electrical circuit, a plurality of valves, a tuned circuit, a source of current supply, said valves, said tuned circuit and said source being connected in series, with the anode of one valve being connected to the cathode of the succeeding valve, each of said valves having internal capacity, an auxiliary electrode in each of said valves capacitatively connected to said tuned circuit for supplying capacitative current therefor, a screening device individual to each of said valves for individually enclosing said valves, a capacitance device connecting each two succeeding screening devices, a potentiometer, and taps from said potentiometer to said screening device for maintaining said screening device at fixed potentials.

12. An electrical system comprising a plurality of discharge devices each having a cathode, plate and grid electrodes, a source of current supply, a multiple tuned resonant circuit, said devices, said resonant circuit and said source being in series, with the plate of one device being directly connected to the cathode of the succeeding device, and means including grounding condensers for said grids for maintaining steady high frequency grid potential.

13. An electrical system comprising a plurality of discharge devices each having a cathode, plate and grid electrodes, a source of current supply and a resonant circuit, said devices, said resonant circuit and said source being in series, with the plate of one device being directly connected to the cathode of the succeeding device, and a condenser placed between each of the grids of said devices and the negative pole of said source for maintaining steady high frequency grid potentials.

14. An amplifying system comprising a plurality of discharge devices each having a cathode, plate and grid electrodes, a source of current supply and a resonant circuit comprising a condenser and inductance coil in parallel, said devices, said resonant circuit and said source being in series, with the plate of one device being directly connected to the cathode of the succeeding device, means for maintaining steady the direct current grid potentials of said devices, and further means comprising grid grounding condensers for maintaining steady the high frequency potential at the grid electrodes of said devices.

15. An amplifying system comprising a plurality of discharge devices each comprising a cathode, plate and grid electrodes, a source of current supply and a resonant circuit, said devices, said resonant circuit and said source being in series, with the plate of one device being directly connected to the cathode of the succeeding device, means for applying high frequency input signals to the first of said devices and for deriving amplified output signals from said resonant circuit, a potentiometer connected across said source provided with tap connections to the grids of said devices for maintaining steady direct current grid potentials, and individual capacities connecting the grids of said devices with the negative pole of said source for stabilizing the high frequency grid potentials.

16. An amplifying system comprising a plurality of discharge devices each having a cathode, plate and grid electrodes, a source of current supply and a resonant circuit, said devices, said resonant circuit and said source being in series, with the plate of one device being directly connected to the cathode of the succeeding device, and capacitative circuit connections from said resonant circuit to the electrodes of said devices.

17. An amplifying system comprising a plurality of discharge devices each having a cathode, plate and grid electrodes, a source of current supply, a resonant circuit, said devices, said resonant circuit and said source being in series, with the plate of one device being directly connected to the cathode of the suceeding device, means for maintaining fixed direct current potentials at the grids of said devices, individual condensers connecting each grid with the negative pole of said source, and further means comprising capacitative circuit connections from said resonant circuit to the cathodes and anodes, respectively, of said devices, balancing the effects of inter-electrode capacity of said devices.

18. In an amplifying system comprising a plurality of discharge devices each having a cathode, plate and grid electrodes, a source of current supply, a tuned circuit, said devices, said resonant circuit and said source being in series, with the plate of one device being directly connected to the cathode of the succeeding device, means for applying high frequency signals to the control electrode of the first of said devices and for deriving amplified signals from said tuned circuit, further means for maintaining fixed direct current grid potentials, a condenser connected between each of the grids of said devices and the negative pole of said source, and a plurality of capacity bridges connected substantially across said tuned circuit and having tap connections to the electrodes of said devices.

19. A system comprising a plurality of discharge devices each having at least a cathode, a plate and a grid electrode, a source of current supply, a parallel tuned circuit, said devices, said tuned circuit and said source being in series, with the plate of one device being directly connected to the cathode of the succeeding device, means for applying signalling potential variations to the grid of the first of said devices, and means for deriving amplified potential variations from said tuned circuit, a high frequency by-pass across said source, a potentiometer connected across said source provided with tap connections to the grids of said devices for maintaining steady direct current grid potentials, individual condensers connected between said grids and the negative pole of said source, and means including capacitative circuit connections from said tuned circuit for supplying leading current to the grid electrodes of said devices.

20. A system comprising a plurality of discharge devices each having at least a cathode, a plate and a grid electrode, a source of current supply, a parallel tuned circuit, said devices, said tuned circuit and said source being in series, with the plate of one device being directly connected to the cathode of the succeeding device, means for applying signalling potential variations to the grid of the first of said devices and means for deriving amplified potential variations from said tuned circuit, a high frequency by-pass across said source, a potentiometer connected across said source provided with tap connections to the grids of said devices for maintaining steady direct current grid potentials, individual condensers connected between said grids and the negative pole of said source, a plurality of capacity bridges fed substantially from said tuned circuit, and a connection from a tap point of each bridge to an electrode of one of said devices.

21. A system comprising a plurality of discharge devices each having at least a cathode, a plate and a grid electrode, a source of current supply, a parallel tuned circuit, said devices, said tuned circuit and said source being in series, with the plate of one device being directly connected to the cathode of the succeeding device, means for applying signalling potential variations to the grid of the first of said devices, and means for deriving amplified potential variations from said tuned circuit, a high frequency by-pass across said source, a potentiometer connected across said source provided with tap connections to the grids of said devices to maintain steady direct current grid potentials, individual condensers connected between said grids and the negative pole of said source, a plurality of capacity bridges each comprising a pair of condensers in series and connected between said tuned circuit and the negative pole of said source, connections from the center point of each of said bridges to an electrode of one of said devices, and a condenser between the cathode and grid of each device.

22. In a system as claimed in claim 21, including a variable resistance in said last mentioned connections.

23. A system comprising a plurality of discharge devices each having at least a cathode, a plate and a grid electrode, a source of current supply, a tuned circuit comprising a capacity and an inductance in parallel, said devices, said tuned circuit and said source being in series, with the plate of one device being directly connected to the cathode of the succeeding device, means for applying signalling potential variations to the grid of the first of said devices, means for deriving amplified potential variations from said tuned circuit, a high frequency by-pass across said source, a potentiometer connected across said source provided with tap connections to the grids of said devices to maintain steady direct current grid potentials, individual condensers connected between said grids and the negative pole of said source, and individual circuit connections including a condenser element from a point of the inductance of said tuned circuit to an electrode of one of said devices.

24. In a system as claimed in claim 23, in which said last mentioned connections include a variable resistance.

25. An electrical circuit comprising a plurality of valves each having a cathode, anode and control electrodes, a tuned circuit, a source of current supply, said valves, said tuned circuit and said source being in series, with the anode of one valve connected to the cathode of a succeeding valve, means for applying input potential variations to the control electrode of one of said valves and for deriving amplified potential variations from said tuned circuit, said valves having internal inter-electrode capacities, an auxiliary electrode for each of said valves, means for applying balancing potential variations derived from said tuned circuit to said auxiliary electrode, the capacity between the auxiliary electrode and the control electrode of each of said valves bearing the same relation to the capacity between the control electrode and anode electrode as the capacity between the auxiliary electrode and cathode bears to the capacity between the cathode and anode of each valve.

ALEXANDER NYMAN